(12) United States Patent
Takahashi et al.

(10) Patent No.: US 12,452,974 B2
(45) Date of Patent: Oct. 21, 2025

(54) LIGHT EMITTING ELEMENT DRIVING DEVICE

(71) Applicant: ROHM CO., LTD., Kyoto (JP)

(72) Inventors: Toru Takahashi, Kyoto (JP); Kei Nagao, Kyoto (JP); Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 141 days.

(21) Appl. No.: 18/466,319

(22) Filed: Sep. 13, 2023

(65) Prior Publication Data

US 2023/0422372 A1 Dec. 28, 2023

Related U.S. Application Data

(63) Continuation of application No. PCT/JP2022/009092, filed on Mar. 3, 2022.

(30) Foreign Application Priority Data

Mar. 16, 2021 (JP) .................................. 2021-042523

(51) Int. Cl.
*H05B 45/30* (2020.01)
*H05B 45/10* (2020.01)
*H05B 45/325* (2020.01)
*H05B 47/14* (2020.01)
*H05B 47/17* (2020.01)

(52) U.S. Cl.
CPC ........... *H05B 45/325* (2020.01); *H05B 45/10* (2020.01); *H05B 47/14* (2020.01); *H05B 47/17* (2020.01)

(58) Field of Classification Search
CPC ........ H05B 45/10; H05B 45/14; H05B 45/30; H05B 45/32; H05B 45/325; H05B 45/37; H05B 45/50; H05B 47/10; H05B 47/105; H05B 47/14; H05B 47/17
See application file for complete search history.

(56) References Cited

U.S. PATENT DOCUMENTS 10,622,349 B2* 4/2020 Nagao .................. H10D 89/811
2018/0035512 A1* 2/2018 Nagao ..................... H05B 45/50

FOREIGN PATENT DOCUMENTS

JP 2019-179662 10/2019

OTHER PUBLICATIONS

International Search Report and Written Opinion in International Appln. No. PCT/JP2022/009092, mailed on May 17, 2022, 13 pages (with machine translation).

* cited by examiner

*Primary Examiner* — Long Nguyen
(74) *Attorney, Agent, or Firm* — Fish & Richardson P.C.

(57) ABSTRACT

In a normal mode in which light emission control of the light emitting element is performed by a dimming controller (15), if no communication signal from an external microprocessor (35) is recognized beyond a first predetermined period, the control logic circuit (10) shifts from the normal mode to a first limp home mode (limp home 2 mode). In the first limp home mode, the dimming controller sets a light emitting element current set value based on a terminal current set value commensurate with a resistance value of a setting resistor (Rextiset1, 2) and a DC dimming set value for each of the channel set in the register (10A), controls the current driver (11) so as to generate a current of the set light emitting element set value, and turns on and off the current driver based on a PWM on-duty for each of the channels set in the register.

13 Claims, 8 Drawing Sheets

Fig.6

| Parameter | NORMAL | LIMP HOME1 | LIMP HOME2 |
|---|---|---|---|
| PWM Dimming setting | DIMMODE=0:DIMSETn<br>DIMMODE=1:0xFF (100%) | LHDTYn (100%) | LHDTYn |
| DC Dimming setting | DIMMODE=0:DCDIMn<br>DIMMODE=1:DIMSETn | 100% | DIMMODE=0:DCDIMn<br>DIMMODE=1:DIMSETn |
| ISET setting | ISETSEL=0:internal<br>ISETSEL=1:EXTISET1 | EXTISET2 | LEXTISET2SEL=0&<br>ISETSEL=0:internal<br>ISETSEL=1:EXTISET1<br>LEXTISET2SEL=1:EXTISET2 |
| Soft start | Yes | Yes | Yes |
| Protection | All | UVLO, TSD, ISET short, and LED OPEN | UVLO, TSD, ISET short, and LED OPEN |

Fig.7

| Address | Bit[7] | Bit[6] | Bit[5] | Bit[4] | Bit[3] | Bit[2] | Bit[1] | Bit[0] |
|---|---|---|---|---|---|---|---|---|
| A | | | LHDTY02 | | | | LHDTY01 | |
| B | | | LHDTY04 | | | | LHDTY03 | |
| C | | | LHDTY06 | | | | LHDTY05 | |
| D | | | LHDTY08 | | | | LHDTY07 | |
| E | | | LHDTY10 | | | | LHDTY09 | |
| F | | | LHDTY12 | | | | LHDTY11 | |
| G | | | LHDTY14 | | | | LHDTY13 | |
| H | | | LHDTY16 | | | | LHDTY15 | |
| I | | | LHDTY18 | | | | LHDTY17 | |
| J | | | LHDTY20 | | | | LHDTY19 | |
| K | | | LHDTY22 | | | | LHDTY21 | |
| L | | | LHDTY24 | | | | LHDTY23 | |
| M | — | — | — | — | — | — | LEXT1SET2SEL | LIMPHEN |

Fig.8

| LHDTYn | PWM Duty Setting for each CH |
|---|---|
| 0 | OFF |
| 1 | 5% |
| 2 | 10% |
| 3 | 15% |
| 4 | 20% |
| 5 | 25% |
| 6 | 30% |
| 7 | 40% |
| 8 | 45% |
| 9 | 50% |
| A | 55% |
| B | 60% |
| C | 70% |
| D | 80% |
| E | 90% |
| F | 100% |

LIGHT EMITTING ELEMENT DRIVING DEVICE

CROSS-REFERENCE TO RELATED APPLICATIONS

This nonprovisional application is a continuation application of International Patent Application No. PCT/JP2022/009092 filed on Mar. 3, 2022, which claims priority Japanese Patent Application No. 2021-042523 filed on Mar. 16, 2021, the entire contents of which are hereby incorporated by reference.

TECHNICAL FIELD

The present disclosure relates to a light emitting element driving device.

BACKGROUND ART

Conventionally, various LED driving devices (LED drivers) for driving an LED (a light emitting diode) as a light emitting element have been developed. For example, Patent Document 1 discloses one example of an LED driving device having a PWM dimming function.

CITATION LIST

Patent Literature

Patent Document 1: JP-A-2019-179662

BRIEF DESCRIPTION OF DRAWINGS

FIG. 6 A table showing parameters in each mode.

FIG. 7 A diagram showing one example of a register map.

FIG. 8 A table showing one example of the correspondence between data values of LHDTYn and PWM dimming on-duty set values.

DESCRIPTION OF EMBODIMENTS

Exemplary embodiments of the present disclosure will be described below with reference to the accompanying drawings. Here, as an example of a light emitting element driving device, an LED driving device will be described.

<1. Configuration of an LED Driving Device>

Figure 1:
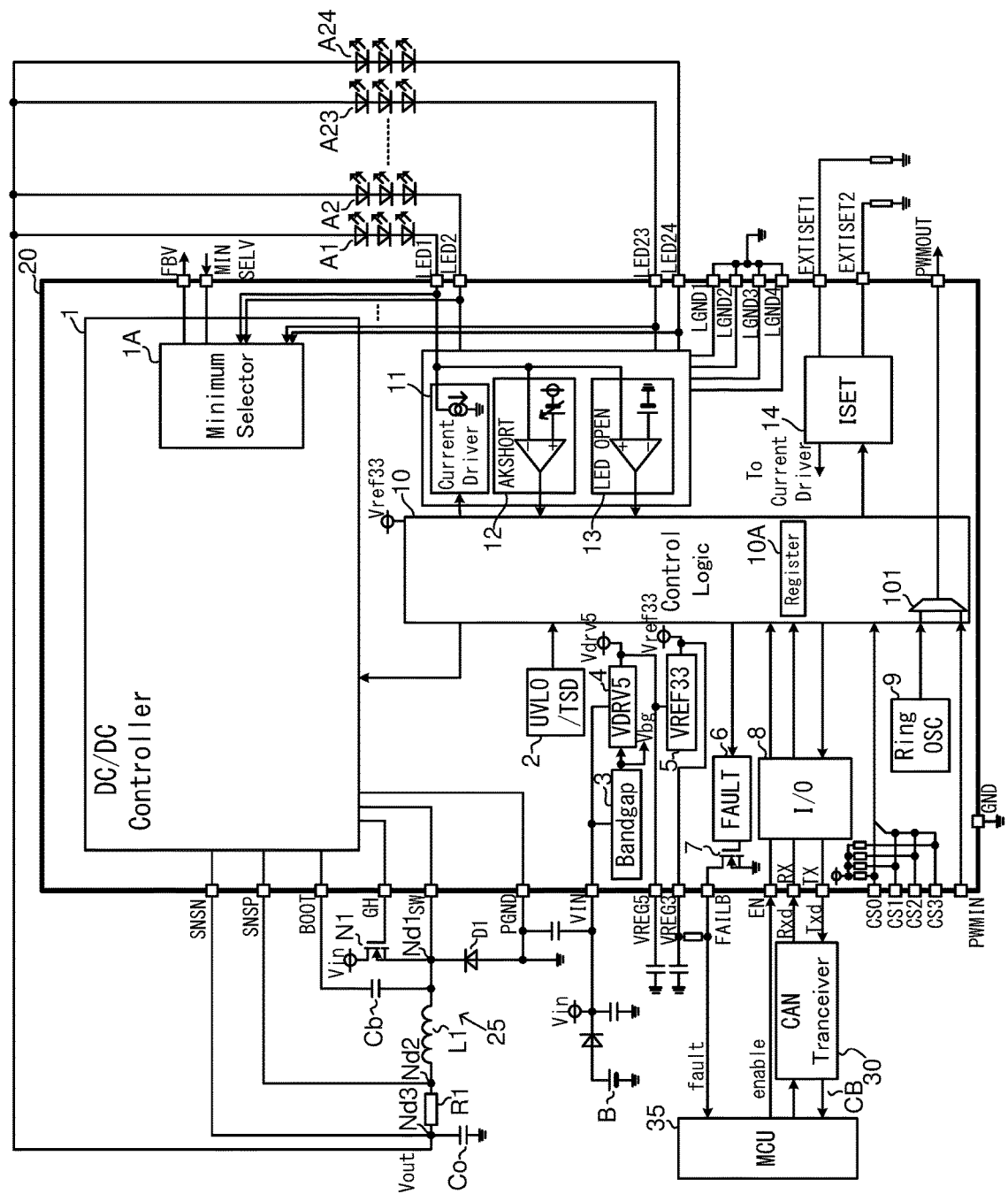
FIG. 1 A diagram showing a configuration of an LED driving device according to an exemplary embodiment of the present disclosure.

FIG. 1 is a diagram showing a configuration of an LED driving device 20 according to an exemplary embodiment of the present disclosure. The LED driving device 20 shown in FIG. 1 drives LED arrays A1 to A24 constituting a plurality of (here, for one example, 24) channels respectively. The LED driving device 20 is, for example, for vehicle onboard applications.

The LED driving device 20 is a semiconductor device including a semiconductor integrated circuit (IC chip) having integrated in it a DC-DC controller 1, a UVLO (undervoltage lock-out)/TSD (thermal shutdown) circuit 2, a band gap reference 3, an internal voltage generator 4, an internal voltage generator 5, a fault notifier 6, an NMOS transistor 7, an I/O (input and output) port 8, a ring oscillator 9, a control logic circuit 10, a current driver 11, a short-circuit detector 12, an open detector 13, and an LED current setter 14.

The LED driving device 20 has, as external terminals for establishing electrical connection with the outside, an SNSN terminal, an SNSP terminal, a BOOT terminal, a GH terminal, an SW terminal, a PGND terminal, a VIN terminal, a VREG5 terminal, a VREG3 terminal, an FAILB terminal, an EN terminal, a RX terminal, a TX terminal, CS0 to CS3 terminals, a PWMIN terminal, an FBV terminal, an MIN-SELV terminal, LED1 to LED24 terminals, LGND1 to LGND4 terminals, an EXTISET1 terminal, an EXTISET2 terminal, a PWMOUT terminal, and a GND terminal.

Outside the LED driving device 20, an output stage 25 is arranged for generating an output voltage Vout from an input voltage Vin by DC-DC conversion to feed the output voltage Vout to the anodes of the LED arrays A1 to A24. The output stage 25 includes, as discrete components, a switching element N1, a diode D1, an inductor L1, a resistor R1, and an output capacitor Co. The switching elements N1 is driven and controlled by the DC-DC controller 1 included in the LED driving device 20. The output stage 25 and the DC-DC controller 1 constitute a DC-DC converter. This embodiment is configured as, among different types of DC-DC converters, a buck (step-down) DC-DC converter of a non-synchronous rectification type.

More specifically, the drain of the switching element N1 configured with an NMOS transistor is connected to an application terminal for the input voltage Vin. A node Nd1 at which the source of the switching element N1 and the cathode of the diode D1 are connected together is connected to the SW terminal. The anode of the diode D1 is connected to the application terminal for the ground potential. The node Nd1 is connected to one terminal of the inductor L1. The other terminal of the inductor L1 is connected to one terminal of the resistor R1 at a node Nd2. The other terminal of the resistor R1 is connected to one terminal of the output capacitor Co at a node Nd3. The other terminal of the output capacitor Co is connected to an application terminal for the ground potential.

The gate of the switching element N1 is connected to the DC-DC controller 1 via the GH terminal. The gate of the switching element N1 is driven by a driver (not shown) included in the DC-DC controller 1. One terminal of a boot capacitor Cb is connected between the inductor L1 and the node Nd1. The other terminal of the boot capacitor Cb is connected to the DC-DC controller 1 via the BOOT terminal.

When the switching element N1 is on, a current passes via the switching element N1 toward the inductor L1 and the resistor R1. When the switching element N1 is turned off, a current then passes via the diode D1 toward the inductor L1 and the resistor R1. Meanwhile, the boot capacitor Cb is charged by the DC-DC controller 1.

When the switching element N1 is turned on, at the BOOT terminal then appears a voltage that is higher than the input voltage Vin by the voltage across the boot capacitor Cb having been charged. It is thus possible to turn on the switching element N1, which is an NMOS transistor.

As the switching element N1 is turned on and off in this way, the output voltage Vout appears at the node Nd3.

The output voltage Vout is fed to the anodes of the LED arrays A1 to A24. The cathodes of the LED arrays A1 to A24 are connected respectively to the LED1 to LED24 terminals. A minimum voltage selector 1A included in the DC-DC controller 1 selects the minimum voltage out of the terminal voltages (cathode voltages) at the LED1 to LED24 terminals.

On the other hand, the node Nd2 to which one terminal of the resistor R1 is connected is connected to the SNSP terminal. The node Nd3 to which the other terminal of the resistor R1 is connected is connected to the SNSN terminal. The voltage at the SNSP terminal and the voltage at the SNSN terminal are fed to an amplifier (not shown) included in the DC-DC controller 1. Thus, the amplifier senses an inductor current passing through the inductor L1 (resistor R1).

The DC-DC controller 1, based on the output of the amplifier mentioned above, injects ripples in the minimum voltage selected by the minimum voltage selector 1A and compares the resulting voltage with a predetermined threshold value to turn on and off the switching element N1. In this way, the DC-DC controller 1 performs hysteresis control so as to keep the minimum voltage among the terminal voltages at the LED1 to LED24 terminals at a desired voltage.

Figure 2:
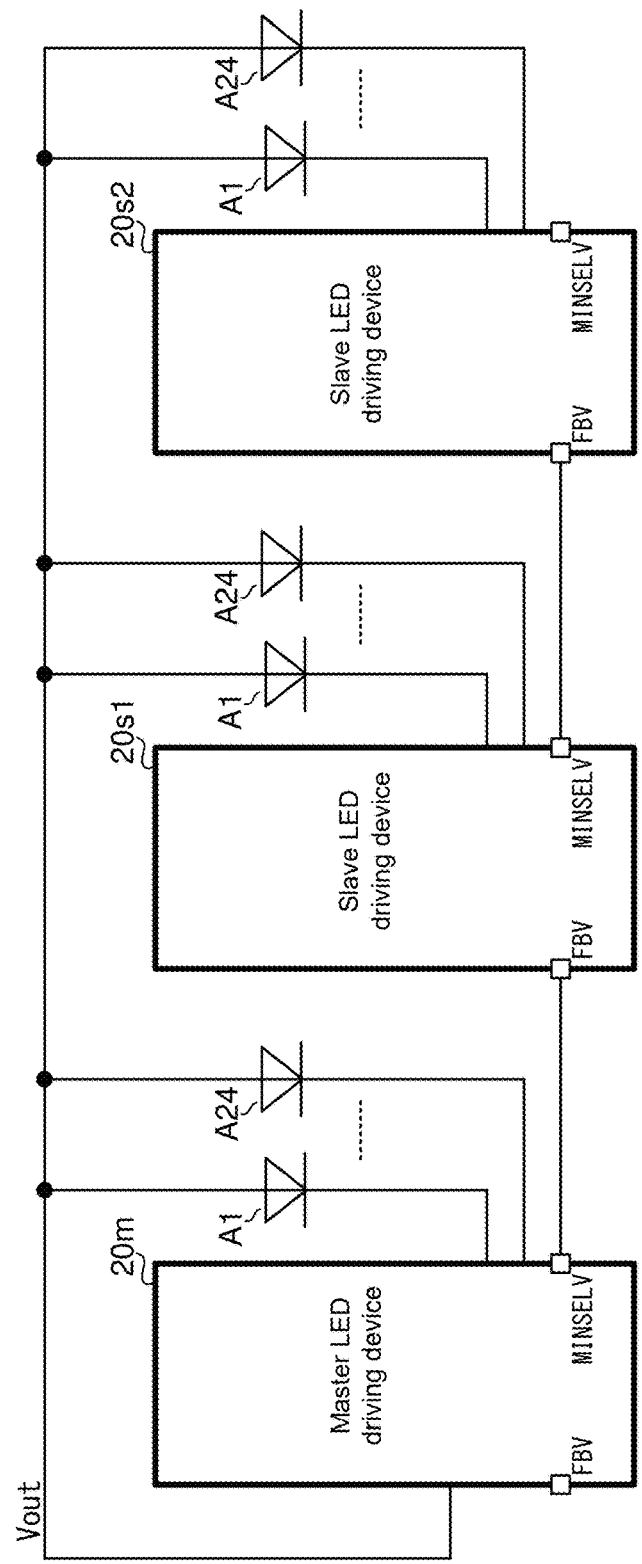
FIG. 2 A diagram showing one example where a plurality of LED driving devices are used connected together.

The FBV and MINSELV terminals are used when a plurality of LED driving devices 20 are used connected together. Now, as one example, FIG. 2 shows a configuration where three LED driving devices 20 (20m, 20s1, 20s2) are used connected together. In FIG. 2, the LED driving device 20m corresponds to a master, and the LED driving devices 20s1 and 20s2 correspond to slaves.

To each of the LED driving devices 20m, 20s1, and 20s2, the cathodes of the LED arrays A1 to A24 are connected. The anodes of the LED arrays A1 to A24 are fed with the output voltage Vout generated by a DC-DC function of the LED driving device 20m. In the LED driving devices 20s1 and 20s2, the DC-DC function is not used. In FIG. 2, for the sake of convenience, the connections related to the output of the output voltage Vout are shown in a simplified form.

The FBV terminal outputs, among the cathode voltages of the LED arrays A1 to A24 and the voltage at the MINSELV terminal, the minimum voltage selected by the minimum voltage selector 1A. To the MINSELV terminal, the FBV terminal of an external LED driving device 20 is connected.

In the example in FIG. 2, the MINSELV terminal of the LED driving device 20m is connected to the FBV terminal of the LED driving device 20s1, and the MINSELV terminal of the LED driving device 20s1 is connected to the FBV terminal of the LED driving device 20s2. The FBV terminal of the LED driving device 20m and the MINSELV terminal of the LED driving device 20s2 are left unconnected. It is preferable that the MINSELV terminal of the LED driving device 20s2 be connected to an application terminal for a high-gain voltage such as a reference voltage Vdrv5 at the VREG5 terminal in the LED driving device 20s2 so as not to affect the selection of the minimum voltage.

Thus, the LED driving device 20s2 selects the minimum voltage out of the cathode voltages of the LED arrays A1 to A24, and outputs the selected minimum voltage from its FBV terminal. The LED driving device 20s1 selects the minimum voltage out of the voltage fed to its MINSELV terminal from the FBV terminal of the LED driving device 20s2 and the cathode voltages of the LED arrays A1 to A24, and outputs the selected minimum voltage from its FBV terminal. The LED driving device 20m selects the minimum voltage out of the voltage fed to its MINSELV terminal from the FBV terminal of the LED driving device 20s1 and the cathode voltages of the LED arrays A1 to A24, and the selected minimum voltage is used for the DC-DC function.

Thus, the output voltage Vout is controlled so that the minimum voltage among the cathode voltages of all the LED arrays (in FIG. 2, 24 channels×3=72 channels) connected to the plurality of LED driving devices 20 connected together remains at a desired value.

The DC-DC function in the LED driving device 20 may be achieved not by hysteresis control as mentioned above but by, for example, PWM control or the like. The LED driving device 20 does not necessarily need to have the DC-DC function.

The description of the configuration shown in FIG. 1 continues. The UVLO/TSD circuit 2 monitors the input voltage Vin to perform low voltage protection and in addition monitors the junction temperature in the LED driving device 20 to perform overheat protection.

The input voltage Vin is generated based on the battery power supply B to be fed to the VIN terminal. A band gap reference 3 is a reference voltage source that generates a stable reference voltage Vbg based on the input voltage Vin fed to the VIN terminal. The internal voltage generator 4 generates a reference voltage Vdrv5 of 5 V based on the input voltage Vin. The output terminal of the internal voltage generator 4 is connected to a capacitor via the VREG5 terminal. The internal voltage generator 5 generates a reference voltage Vref33 of 3.3 V based on the reference voltage Vdrv5. The output terminal of the internal voltage generator 5 is connected to a capacitor via the VREG3 terminal.

An MCU (microcontroller unit) 35 (external microprocessor) and a CAN (controller area network) transceiver 30 are arranged outside the LED driving device 20.

The NMOS transistor 7 is pulled up to the reference voltage Vref33 at the VREG3 terminal with a resistor. The fault notifier 6 turns on the NMOS transistor 7 based on a command from the control logic circuit 10 to feed the MCU 35 with a Low (low-level) fault signal "fault" indicating a fault.

The MCU 35 transmits an enable signal "enable" to the control logic circuit 10 via the EN terminal and the I/O port 8.

The CAN transceiver 30 receives data from the MCU 35 via a CAN bus CB and transmits the data, as reception data Rxd, to the RX terminal. The control logic circuit 10 receives the reception data Rxd via the I/O port 8. The control logic circuit 10 transmits transmission data Txd to the TX terminal via the I/O port 8. The CAN transceiver 30 transmits the transmission data Txd received from the TX terminal further to the MCU 35 via the CAN bus CB. The I/O port 8 is configured as a UART (universal asynchronous receiver-transmitter) and performs conversion between serial and parallel signals.

The CS0 to CS3 terminals are each pulled up to a supply voltage with a resistor. With a combination of High (high level) and Low set at the CS0 to CS3 terminals, a unique number (ID) for identifying the LED driving device 20 is set in the control logic circuit 10.

The ring oscillator 9 is an oscillator that generates a clock signal. Based on the clock signal, a PWM signal is generated and PWM dimming is performed.

The PWMIN and PWMOUT terminals and the selector 101 are used, in a case where, as will be described later, a plurality of LED driving devices 20 are connected together, to synchronize the frequency of the clock signal generated by the ring oscillator 9 among those LED driving devices 20.

The current driver 11 is provided one for each of the LED1 to LED24 terminals and passes a constant current through each of the LED arrays A1 to A24. The current driver 11 is turned on and off based on the PWM signal, and thus the PWM dimming of the LED arrays A1 to A24 is performed. DC dimming is also possible by, while keeping the current driver 11 on, varying the set value of the constant current.

The short-circuit detector 12 is provided one for each of the LED1 to LED24 terminals and, based on the voltage at the corresponding terminal, senses a short-circuit in any of the LED arrays A1 to A24 (a short-circuit between the cathode of the LED and the output voltage Vout) to perform LED short-circuit protection. In LED short-circuit protection, the current driver 11 corresponding to the LED array for the channel in which the short-circuiting has been sensed is turned off.

The open detector 13 is provided one for each of the LED1 to LED24 terminals and, based on the voltage of at the corresponding terminal, senses an open-circuit in any of the LED arrays A1 to A24 to perform LED open-circuit protection.

<2. Connecting a Plurality of LED Driving Devices>

Figure 3:
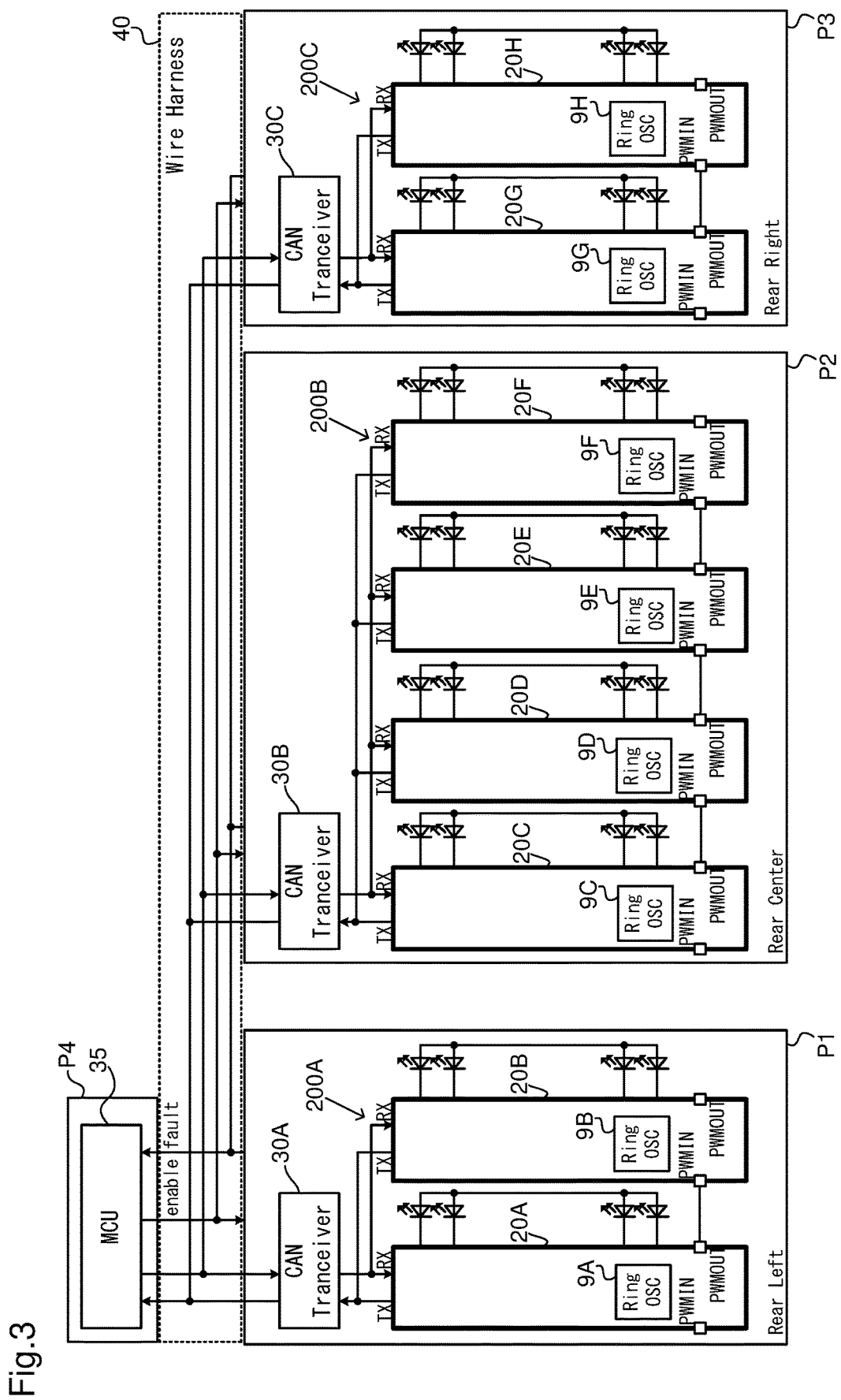
FIG. 3 A diagram showing a configuration example of a system in which an LED driving device is applied to a rear lamp of a vehicle.

In this embodiment, it is possible to connect a plurality of LED driving devices 20 to cope with applications requiring a large number of LEDs to be lit. FIG. 3 shows, as one example of such applications, a configuration example of a system in which the LED driving device 20 is applied to a rear lamp of a vehicle. In FIG. 3, for the sake of convenience, the individual LED driving devices 20 are referred to by the reference signs 20A to 20H respectively. The CAN transceivers 30A to 30C in FIG. 3 correspond to the CAN transceivers 30 shown in FIG. 1.

As shown in FIG. 3, the LED driving devices 20A and 20B, and the CAN transceiver 30A are applied to the left rear lamp of the vehicle. The LED driving devices 20A and 20B and the CAN transceiver 30A are mounted on a printed circuit board P1. Connecting the LED driving devices 20A and 20B together gives an LED driving system 200A.

In the left rear lamp of the vehicle, the LED driving devices 20A and 20B drive 24 channels×2=48 channels of LED arrays. The PWMOUT terminal of the LED driving device 20A in the front stage is connected to the PWMIN terminal of the LED driving device 20B in the rear stage. As a result, with the LED driving device 20A as a master and the LED driving device 20B as a slave, it is possible to synchronize the frequency of the clock signal generated by the ring oscillator 9A in the LED driving device 20A with the frequency of the clock signal generated by the ring oscillator 9B in the LED driving device 20B.

As shown in FIG. 3, the LED driving devices 20C to 20F and the CAN transceiver 30B are applied to a middle rear lamp of the vehicle. The LED driving devices 20C to 20F and the CAN transceiver 30B are mounted on a printed circuit board P2. Connecting the LED driving devices 20C to 20F together gives an LED driving system 200B.

In the middle rear lamp of the vehicle, the LED driving devices 20C to 20F drive 24 channels×4=96 channels of LED arrays. The PWMOUT terminal of the LED driving device 20C in the front stage is connected to the PWMIN terminal of the LED driving device 20D in the rear stage. The PWMOUT terminal of the LED driving device 20D in the front stage is connected to the PWMIN terminal of the LED driving device 20E in the rear stage. The PWMOUT terminal of the LED driving device 20E in the front stage is connected to the PWMIN terminal of the LED driving device 20F in the rear stage. As a result, with the LED driving device 20C as a master and the LED driving device 20D to 20F as slaves, it is possible to synchronize the frequency of the clock signal generated by the ring oscillator 9C in the LED driving device 20C with the frequency of the clock signal generated by the ring oscillators 9D to 9F in the LED driving devices 20D to 20F.

As shown in FIG. 3, the LED driving devices 20G and 20H and the CAN transceiver 30C are applied to the right rear lamp of the vehicle. The LED driving devices 20G and 20H and the CAN transceiver 30C are mounted on a printed circuit board P3. Connecting the LED driving devices 20G and 20H together gives an LED driving system 200C.

In the right rear lamp of the vehicle, the LED driving devices 20G and 20H drive 24 channels×2=48 channels of LED arrays. The PWMOUT terminal of the LED driving device 20G in the front stage is connected to the PWMIN terminal of the LED driving device 20H in the rear stage. As a result, with the LED driving device 20G as a master and the LED driving device 20H as a slave, it is possible to synchronize the frequency of the clock signal generated by the ring oscillator 9G in the LED driving device 20G with the frequency of the clock signal generated by the ring oscillator 9H in the LED driving device 20H.

The LED driving devices 20A and 20B and the CAN transceiver 30A can transmit and receive data among them. The LED driving devices 20C to 20F and the CAN transceiver 30B can transmit and receive data among them. The LED driving devices 20G and 20H and the CAN transceiver 30C can transmit and receive data among them.

The CAN transceivers 30A to 30C can receive and transmit data from and to the MCU 35 mounted on a printed circuit board P4 via a wire harness 40. The CAN bus CB (FIG. 1) is included in the wire harness 40. The MCU 35 can instruct the LED driving devices 20A to 20H on a PWM dimming on-duty via the CAN transceivers 30A to 30C. The MCU 35 can make on the LED driving device various settings such as, in addition to the PWM dimming on-duty, a set value for DC dimming and the like. The set value can be written to a register 10A (see FIG. 1) included in the control logic circuit 10.

The MCU 35 can transmit the enable signal "enable" via the wire harness 40 to the LED driving devices 20A to 20H and in addition can receive the fault signal "fault" via the wire harness 40 from the LED driving devices 20A to 20H. The enable signal "enable" can be transmitted from other than the MCU 35.

<3. Dimming Controller>

Figure 4:
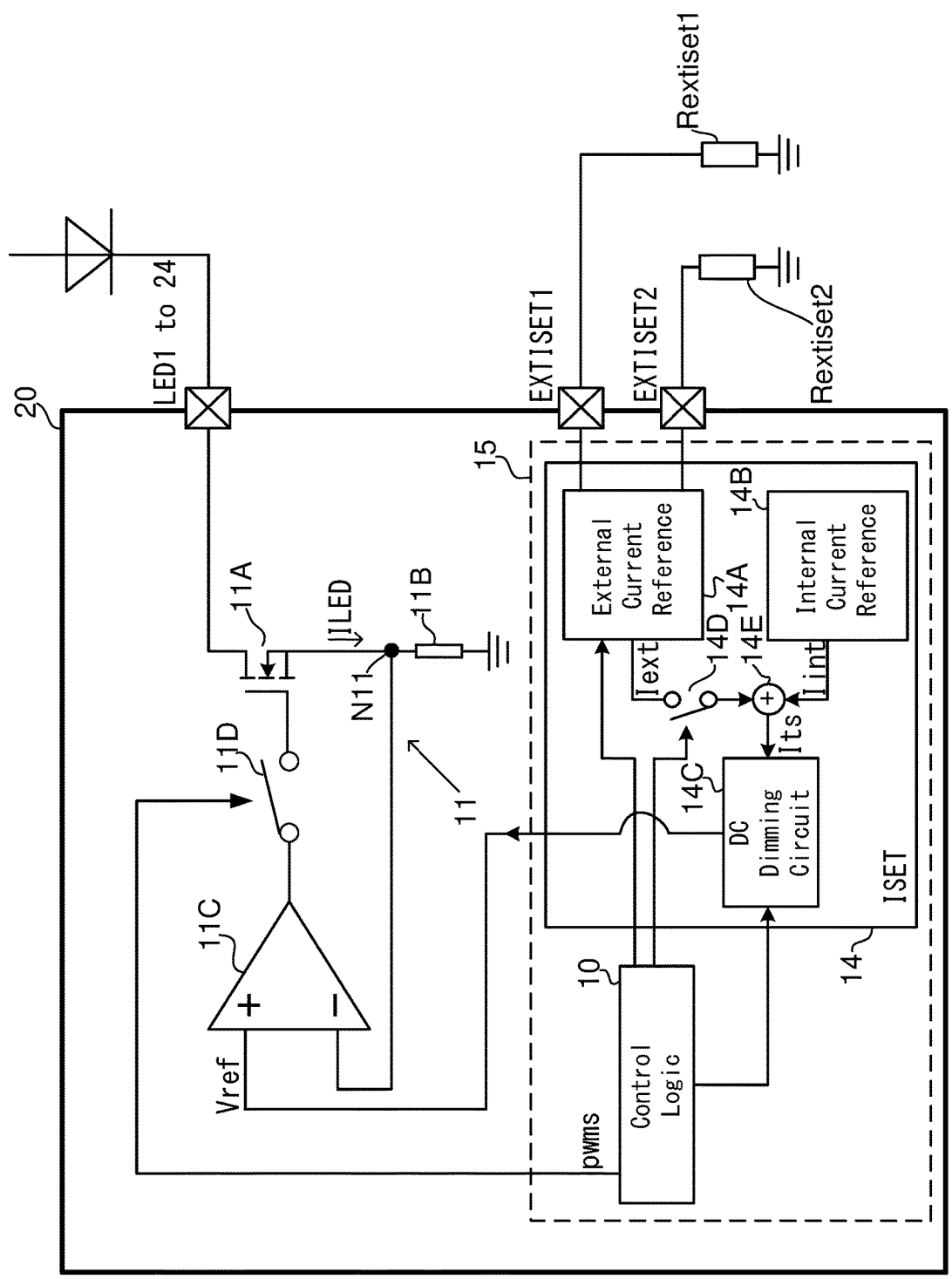
FIG. 4 A diagram showing a principal portion of the configuration of a dimming controller and a current driver.

Next, the configuration for LED dimming control will be described with reference to FIG. 4. As shown in FIG. 4, the LED driving device 20 includes a dimming controller 15. The dimming controller 15 is configured to be able to perform dimming of the LED arrays A1 to A24 of different channels. Note that, for the sake of convenience, FIG. 4 only shows the current driver 11 corresponding to the LED array of one channel.

As shown in FIG. 4, the current driver 11 includes an NMOS transistor 11A, a resistor 11B, an error amplifier 11C, and a switch 11D. The drain of the NMOS transistor 11A is connected to one of the LED1 to LED24 terminals. The source of the NMOS transistor 11A is connected to one terminal of the resistor 11B. The other terminal of the resistor 11B is connected to the application terminal for the ground potential. The connection node N11 to which the source of the NMOS transistor 11A and the resistor 11B are connected is connected to the inverting input terminal (−) of the error amplifier 11C. To the non-inverting input terminal (+) of the error amplifier 11C, a reference voltage Vref, described later, is applied. The switch 11D is arranged between the output terminal of the error amplifier 11C and the gate of the NMOS transistor 11A.

The dimming controller 15 includes the LED current setter 14 (FIG. 1) and the control logic circuit 10. To the EXTISET1 terminal as an external terminal (first external terminal), a setting resistor Rextiset1 (first setting resistor) can be externally connected. To the EXTISET2 terminal as an external terminal (second external terminal), which is an external terminal, a setting resistor Rextiset2 (second setting resistor) can be externally connected.

The LED current setter 14 includes an external current setter 14A, an internal current setter 14B, a DC dimming circuit 14C, a switch 14D, and an adder 14E. The external current setter 14A sets an external current set value Iext in accordance with the resistance value of a setting resistor Rset1 connected to the EXTISET1 terminal or the resistance value of a setting resistor Rset2 connected to the EXTISET2 terminal. The external current set value Iext is given by formula (1) below.

$$Iext=(Vextiset/Rextiset) \times A \quad (1)$$

where Vextiset is the voltage at EXTISET1 or EXTISET2 terminal, Rextiset is the resistance value across Rextiset1 or Rextiset2, and A is a constant.

The internal current setter 14B sets a predetermined internal current set value Iint. The adder 14E is fed with the internal current set value Iint and also with the external current set value Iext via the switch 14D. The adder 14E outputs a terminal current set value Its as the summation result.

With settings such that neither of the EXTISET1 and EXTISET2 terminals are used, the control logic circuit 10 keeps the switch 14D off. Thus, the internal current set value Iint (=terminal current set value Its) is output from the adder 14E to be fed to the DC dimming circuit 14C. In this case, based on the internal current set value Iint and a DC dimming set value [%] requested from the control logic circuit 10, the DC dimming circuit 14C sets an LED current set value Iset according to formula (2) below.

$$Iset [mA]=Iint \times DC \text{ dimming set value } [\%] \quad (2)$$

By contrast, with settings such that the EXTISET1 terminal or the EXTISET2 terminal is used, the control logic circuit 10 keeps the switch 14D on. Thus, the value resulting from adding up the internal current set value Iint and the external current set value Iext (that is, the terminal current set value Its) is output from the adder 14E to be fed to the DC dimming circuit 14C. In this case, based on the output from the adder 14E and a DC dimming set value [%] requested from the control logic circuit 10, the DC dimming circuit 14C sets the LED current set value Iset according to formula (3) below.

$$Iset [mA]=(Iint+Iext) \times DC \text{ dimming set value } [\%] \quad (3)$$

The DC dimming circuit 14C outputs to the error amplifier 11C the reference voltage Vref commensurate with the LED current set value Iset set as described above.

When the switch 11D is on and thus the current driver 11 is on, the voltage at the node N11 is controlled so as to remain equal to the reference voltage Vref, and the LED current ILED generated by the reference voltage Vref and the resistance value of the resistor 11B passes through the LED terminal (one of the LED1 to LED 24 terminals). In this way, the LED current ILED with the current value of the LED current set value Iset described above can be generated. The dimming controller 15 (control logic circuit 10) can perform DC dimming by, while keeping the switch 11D on, varying the set value of the LED current set value Iset.

In accordance with the PWM dimming on-duty set value set in the register 10A, the control logic circuit 10 generates the PWM signal "pwms". Within one period of the PWM signal "pwms", during the on-duty period, the switch 11D is on and thus the current driver 11 is on; during the off-duty period, the switch 11D is off and thus the current driver 11 is off. Thus, PWM dimming in accordance with the PWM signal "pwms" is performed.

The LED current ILED (average LED current) during PWM dimming is given by formula (4) below.

$$ILED [mA]=LED \text{ current set value } Iset [mA] \times PWM \\ \text{dimming on-duty set value } [\%] \quad (4)$$

During DC dimming, the control logic circuit 10 controls the switch 11D with a PWM dimming on-duty of 100%.

In a normal mode, described later, a value commensurate with the resistance value of the setting resistor Rextiset1 connected to the EXTISET1 terminal is used as the external current set value Iext mentioned above, while, in a limp home mode, described later, a value commensurate with the resistance value of the setting resistor Rextiset2 connected to the EXTISET2 terminal can be used instead.

<4. State Transition>

Figure 5:
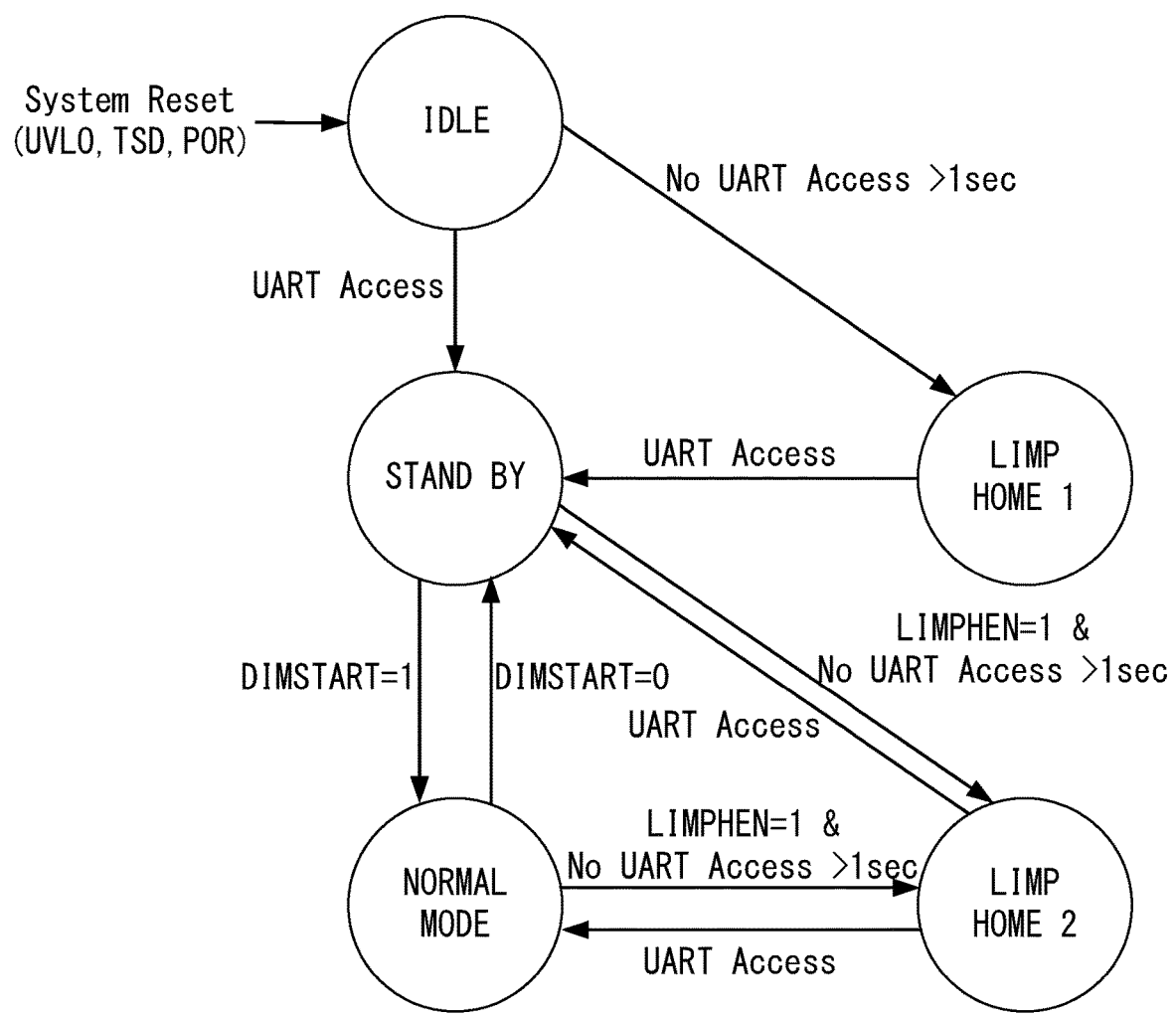
FIG. 5 A state transition diagram of an LED driving device.

Next, mode transition in the LED driving device 20 will be described with reference to a state transition diagram in FIG. 5. As shown in FIG. 5, when from a state where the control logic circuit 10 is reset the reset state is canceled by the UVLO/TSD circuit 2 or by power-on resetting, the control logic circuit 10 shifts to an idle mode (IDLE). Reset cancellation by power-on resetting is performed with the enable signal "enable" that rises at the rise of the input voltage Vin.

The idle mode is a state where, although no communication signal is being received, one can be received from the MCU 35 via the CAN transceiver 30 and the I/O port 8. If, after the shift to the idle mode, the control logic circuit 10 receives the communication signal (UART access recognized) within a predetermined period (here, say, 1 sec), the control logic circuit 10 shifts to a stand-by mode (STAND_BY).

In the stand-by mode, with the communication signal from the MCU 35, various settings are written to the register 10A. In the stand-by mode, the LED is extinguished. The various settings mentioned above include the DC dimming set value and the PWM dimming on-duty set value mentioned above.

On completion of settings in the register 10A in the stand-by mode, when, with the communication signal, a dimming start flag DIMSTART=1 is written to the register the control logic circuit 10 shifts to the normal mode (NORMAL).

<<4-1. Normal Mode>>

In the normal mode, the dimming controller 15 starts LED light emission control by DC dimming or PWM dimming. FIG. 6 is a table showing, for each of the normal mode (NORMAL) and limp home 1 and limp home 2 modes (LIMP HOME 1 and 2), of which the latter two will be described later, PWM dimming settings, DC dimming settings, external terminal use settings, availability of a soft-start function, and valid protection functions.

As shown in FIG. 6, in the normal mode, depending on a dimming mode flag DIMMODE set in the register 10A, different DC dimming settings and PWM dimming settings are used. In a DC dimming mode with a dimming mode flag DIMMODE=1, as the DC dimming set value [%], a dimming set value DIMSETn set in the register 10A is used, and, as the PWM dimming on-duty set value [%], 100% is used. The letter "n" in "DIMSETn" represents any of the channels of the LED arrays A1 to A24 (LED1 terminal to LED 24 terminal). The same applies to other set values.

By contrast, in a PWM dimming mode with the dimming mode flag DIMMODE=0, as the DC dimming set value [%], a DC set value DCDIMn set in the register 10A is used, and, as the PWM dimming on-duty set value [%], the dimming set value DIMSETn is used.

As shown in FIG. 6, in the normal mode, in accordance with a current setting selection flag ISETSEL set in the register 10A, whether the EXTISET1 terminal is used or not is set. ISETSEL=0 is a setting for disuse of the EXTISET1 terminal, and, based on the internal current set value Iint, the LED current set value Iset is set according to formula (2) above.

By contrast, ISETSEL=1 is a setting for use of the EXTISET1 terminal, and the LED current set value Iset is set according to formulae (1) and (3) above.

Thus, in the normal mode, in the DC dimming mode (DIMMODE=1), the dimming controller 15 performs, for each channel, light emission control with the LED current ILED according to the formula below.

ILED=terminal current set value Its(internal or EXI-SET1)×DIMSETn×100%

On the other hand, in the PWM dimming mode with DIMMODE=0, as the DC dimming set value, a DC set value DCDIMn set in the register 10A is used, and, as the PWM dimming on-duty set value, the dimming set value DIMSETn is used.

Thus, in the normal mode, in the PWM dimming mode (DIMMODE=0), the dimming controller 15 performs, for each channel, light emission control with the LED current ILED according to the formula below.

ILED=terminal current set value Its(internal or EXI-SET1)×DCDIMn×DIMSETn

As shown in FIG. 5, if, in the normal mode, a dimming start flag DIMSTART=0 (dimming stop request) is written to the register 10A, the control logic circuit 10 shifts to the stand-by mode (STAND_BY). Here, the settings in the register 10A are held and the LED is extinguished.

<<4-2. Limp Home During Start-Up>>

As shown in FIG. 5, if, after the shift to the idle mode, the control logic circuit 10 receives no communication signal (no UART access recognized) from the MCU 35 within a predetermined period (here, 1 sec), the control logic circuit 10 judges that there is a fault and shifts to a limp home 1 mode (LIMP HOME1) (second limp home mode).

In the limp home 1 mode, the dimming controller 15 starts LED light emission control as described below. As shown in FIG. 6, the limp home 1 mode has a setting for use of the EXTISET2 terminal. For the DC dimming set value, 100% is used. For the PWM dimming on-duty set value, a limp home duty set value LHDTYn set in the register 10A is used.

FIG. 7 shows one example of the register map of the limp home duty set value LHDTYn in the register 10A. As shown in FIG. 7, LHDTYn's are assigned one for lower four bits and another for upper four bits at each address. Since there are 12 addresses (A to L), LHDTYn's for 24 channels are assigned.

FIG. 8 shows one example of the relationship between the data values of LHDTYn, which is 4-bit data, and the PWM dimming on-duty set values. Here, in the limp home 1 mode, the limp home duty set value LHDTYn has not yet been set by the MCU 35 in the register 10A and is an initial value. The initial value of the limp home duty set value LHDTYn is "F", and, as seen from FIG. 8, the PWM dimming on-duty set value is 100%.

Thus, in the limp home 1 mode, based on formulae (1) and (3) noted above, the dimming controller 15 performs, for each channel, light emission control with the LED current ILED according to the formula below.

ILED=(Iint+Iext)(EXTISET2)×100%×LHDTYn (100%)

That is, in the limp home 1 mode, light emission control is performed, for all the channels, with the LED current ILED according to the formula below.

ILED=(Iint+Iext)(EXTISET2)×100%×100%

Thus, by externally connecting the setting resistor Rextiset2 with a desired resistance value for each LED driving device 20, it is possible to set the brightness of the LED in the limp home 1 mode for each LED driving device 20. For example, it is possible to set the brightness of the LED in the limp home 1 mode for each application (for example, for each of the left, right, and middle rear lamps) on the same vehicle. It is also possible to cope with a case where different models of vehicles use different kinds of LEDs (e.g., white or yellow LEDs) and thus require different LED current values.

When the EXTISET2 terminal is left open, the DC dimming circuit 14C sets the terminal current set value Its at 0 mA. Thus, in this case, the LEDs for all the channels can be extinguished. This makes it possible to cope with, for example, applications (for example, a blinker lamp, a brake lamps, etc.) in which LEDs have to be extinguished in the limp home 1 mode.

As shown in FIG. 5, if UART access is recognized during the limp home 1 mode, a shift to the stand-by mode is performed.

<<4-3. Limp Home in Normal Mode>>

As shown in FIG. 5, if, in the normal mode (NORMAL), a limp home enable flag LIMPHEN=1 (enabled) and, in addition, no UART access is recognized beyond a predetermined period (here, 1 sec), the control logic circuit 10 shifts to a limp home 2 mode (LIMP HOME2) (first limp home mode). The limp home enable flag LIMPHEN is, for example, as shown in FIG. 7, assigned to the lowest bit at a predetermined address (M) in the register 10A.

In the limp home 2 mode, the dimming controller 15 starts LED light emission control as described below. In the limp home 2 mode, as shown in FIG. 6, in accordance with an EXTISET2 terminal selection flag LEXTISET2SEL set in the register 10A, whether the EXTISET2 terminal is used or not is selected. As shown in FIG. 7, the LEXTISET2SEL is assigned, for example, to the second lowest bit at a predetermined address (M) at which a limp home enable flag LIMPHEN is set.

Specifically, if LEXTISET2SEL=0 (not used), then as in the normal mode, in accordance with the current setting selection flag ISETSEL, whether the EXTISET1 terminal is used or not is selected. By contrast, if LEXTISET2SEL=1, the EXTISET2 terminal is used.

In the limp home 2 mode, as shown in FIG. 6, the DC dimming set value is similar to that in the normal mode. That is, if the dimming mode flag DIMMODE=1 (DC dimming mode), as the DC dimming set value, the dimming set value DIMSETn is used and, if the dimming mode flag DIMMODE=0 (PWM dimming mode), as the DC dimming set value, the DC set value DCDIMn is used. Thus, in the normal mode and the limp home 2 mode, the DC dimming set value for each channel is the same.

As shown in FIG. 6, for the PWM dimming on-duty set value, the limp home duty set value LHDTYn is used. Here, LHDTYn set for each channel according to FIG. 8 is used.

Thus, in the limp home 2 mode, the dimming controller 15 performs, for each channel, light emission control with the LED current ILED according to the formula below.

ILED=terminal current set value Its(internal or EXI-SET1 or EXTISET2)×DC dimming set value (DCDIMn or DIMSETn)×LHDTYn As described above, in the limp home 2 mode reached through a shift from the normal mode, it is possible to set the brightness of LEDs for each channel, and thus to achieve flexible dimming. For example, it is possible to cope with cases such as where different LED currents are used among channels, where LEDs for some channels are extinguished, and where different kinds of LEDs (white or yellow LEDs, etc.) are used among channels.

Even when, in the normal mode, no UART access is recognized beyond a predetermined period, if the limp home enable flag LIMPHEN=0 (disabled), no shift to the limp home 2 mode is performed.

As shown in FIG. 5, after a shift from the normal mode to the limp home 2 mode, if UART access is recognized, a shift back to the normal mode is performed.

As shown in FIG. 5, if, in the stand-by mode, the limp home enable flag LIMPHEN=1 (enabled) and, in addition, no UART access is recognized beyond a predetermined period (here, 1 sec), a shift to the limp home 2 mode is performed. Furthermore, if, in the limp home 2 mode, UART access is recognized, a shift back to the stand-by mode is performed.

<<4-4. Example of Settings of the LED Current>>

Here, examples of settings of the LED current will be described for different cases.

<Case 1>

The limp home 1 mode:

terminal current set value Its(EXTISET2)(60 mA)× 100%×LHDTYn(100% for all the channels)

The normal mode:

terminal current set value Its(EXTISET1)(125 mA)× DCDIMn(100% for all the channels)×DIMSETn The limp home 2 mode:

terminal current set value Its(EXTISET2)(60 mA)× DCDIMn(100% for all the channels)×LHDTYn In Case 1 described above, the EXTISET2 terminal is connected to the setting resistor Rextiset2 instead of being left open, and, in the limp home 2 mode, with LEXTISET2SEL=1, use of the EXTISET2 terminal is selected.

<Case 2>

The limp home 1 mode:

terminal current set value Its(EXTISET2)(0 mA)× 100%×LHDTYn(100% for all the channels)

The normal mode:

terminal current set value Its(EXTISET1)(125 mA)× DCDIMn(100% for all the channels)×DIMSETn The limp home 2 mode:

terminal current set value Its(EXTISET2)(0 mA)× DCDIMn(100% for all the channels)×LHDTYn In Case 2 described above, the EXTISET2 terminal is left open, and, in the limp home 2 mode, with LEXTISET2SEL=1, use of the EXTISET2 terminal is selected. In this way, in both of the limp home 1 and the limp home 2 modes, the LEDs for all the channels are extinguished.

<Case 3>

The limp home 1 mode:

terminal current set value Its(EXTISET2)(0 mA)× 100%×LHDTYn(100% for all the channels)

The normal mode:

terminal current set value Its(EXTISET1)(125 mA)× DCDIMn(50% for all the channels)×DIMSETn The limp home 2 mode:

terminal current set value Its(EXTISET1)(125 mA)× DCDIMn(50% for all the channels)×LHDTYn In Case 3 above, the EXTISET2 terminal is left open, and, in the limp home 2 mode, with LEXTISET2SEL=0 and in addition ISETSEL=1, use of the EXTISET1 terminal is selected. In this way, in the limp home 1 mode, LEDs for all the channels are extinguished, but in the limp home 2 mode, the brightness of LEDs can be set for each channel.

<<4-5. Others>>

LHDTYn is updated such that, as soon as LHDTYn is written to the register 10A, it is reflected in the operation of a PWM generator (included in the control logic circuit 10) that generates the PWM signal "pwms".

On shifting to each of the normal mode, the limp home 1 mode, and the limp home 2 mode, the control logic circuit 10 instructs the DC-DC controller 1 to raise the output voltage Vout. Here, as shown in FIG. 6, the DC-DC controller 1 performs soft starting to suppress an overshoot in the output voltage Vout.

As shown in FIG. 6, in the normal mode, all the protection functions are valid, while, in the limp home 1 mode and the limp home 2 mode, only specific protection functions shown in FIG. 6 are valid. The specific protection functions include low voltage protection (UVLO), overheat protection (TSD), external terminal short-circuit protection (ISET short), and LED open protection (LED OPEN). Here, the external terminal short-circuit protection is a function in which, on sensing that the EXTISET2 terminal is short-circuited to the ground potential, the dimming controller 15 switches the terminal current set value Its, in the limp home 1 mode, to a predetermined internal set value (for example, 60 mA) and, in the limp home 2 mode, to a predetermined set value of the register 10A.

The specific protection functions described above, though in the limp home mode in which communication state with the MCU 35 is faulty they cannot notify the MCU 35 of a fault signal "fault" (FIG. 1), are still necessary to avoid abnormal operation of the LED driving device 20. LED short-circuit protection, since it leads to no abnormal operation and its necessity is low, is not included in the specific protection functions.

The illustrative embodiments of the present disclosure described above allow for many modifications made without departing from the spirit of the present disclosure.

<5. Notes>

According to one aspect of what is disclosed herein, a light emitting element driving device (20) includes: a current driver (11) configured to generate a current to be passed in light emitting elements (A1 to A24) for a plurality of channels; a dimming controller (15) configured to control the current driver; a control logic circuit (10) including a register (10A); and an external terminal (EXISET1, 2) to which a setting resistor (Rextiset1, 2) can be externally connected. In a normal mode in which light emission control for the light emitting elements is performed by the dimming controller, if no communication signal from an external microprocessor (35) is recognized beyond a first predetermined period, the control logic circuit shifts from the normal mode to a first limp home mode (limp home 2 mode). In the first limp home mode, the dimming controller sets a light emitting element current set value (Iset) based on a terminal current set value (Its) commensurate with the resistance value of the setting resistor as well as a DC dimming set value for each of the channels set in the register. The dimming controller controls the current driver so as to generate a current of the set light emitting element current set value and turns on and off the current driver based on a PWM on-duty set value for each of the channels set in the register. (A first configuration.)

In the first configuration described above, preferably, the light emitting element driving device further includes a first external terminal (EXISET1) to which a first setting resistor (Rextiset 1) can be externally connected. In the normal mode, the dimming controller sets the light emitting element current set value based on the terminal current set value commensurate with the resistance value of the first setting resistor as well as the DC dimming set value and controls the current driver so as to generate a current with the set light emitting element current set value. The external terminal is the same as the first external terminal. The setting resistor is the same as the first setting resistor. (A second configuration.)

In the second configuration described above, preferably, in the normal mode and in the first limp home mode, a predetermined internal value can be selected as the terminal current set value. (A third configuration.)

In the second or third configuration described above, preferably, in the normal mode and in the first limp home mode, the DC dimming set value for each of the channels is the same. (A fourth configuration.)

In any of the first to forth configurations described above, preferably, the light emitting element driving device further includes a second external terminal (EXTISET2) to which a second setting resistor (Rextiset2) can be externally connected. If no communication signal from the external microprocessor is recognized beyond a second predetermined period after a shift to an idle mode following cancellation of a reset state, the control logic circuit shifts from the idle mode to a second limp home mode (limp home 1 mode). In the second limp home mode, the dimming controller sets the light emitting element current set value based on the terminal current set value commensurate with the resistance value of the second setting resistor as well as the DC dimming set value that is common to all the channels. The dimming controller controls the current driver so as to generate a current with the set light emitting element current set value, and turns on and off the current driver based on the PWM on-duty set value that is common to all the channels. The external terminal is different from the second external terminal. The setting resistor is different from the second setting resistor. (A fifth configuration.)

In the fifth configuration described above, preferably, when the second external terminal is open, the dimming controller sets the terminal current set value at 0. (A sixth configuration.)

In the fifth or sixth configuration described above, preferably, in the first limp home mode, a value commensurate with the resistance value of the second setting resistor can be selected as the terminal current set value. (A seventh configuration.)

In any of the first to seventh configurations described above, preferably, in a stand-by mode reached through a shift from the normal mode on receipt of a dimming stop request in the normal mode, if no communication signal is recognized from the external microprocessor beyond a third predetermined period, the control logic circuit shifts from the stand-by mode to the first limp home mode. (An eighth configuration.)

In the eighth configuration described above, preferably, the light emitting element driving device further includes a DC-DC controller (1) for generating an output voltage to be fed to the light emitting elements. On a shift to the first limp home mode, the DC-DC controller performs soft starting. (A ninth configuration.)

In any of the first to ninth configurations described above, preferably, the dimming controller has an external terminal short-circuit protection function in which, on sensing that the external terminal is short-circuited to the ground potential, the dimming controller uses a predetermined set value as the terminal current set value. (A tenth configuration.)

In the tenth configuration described above, preferably, in the first limp home mode, only specific protection functions including the external terminal short-circuit protection function are valid. (An eleventh configuration.)

In the eleventh configuration described above, preferably, a light emitting element short-circuit protection function that senses a short-circuit in the light emitting elements to perform protection is not included in the specific protection functions. (A twelfth configuration.)

INDUSTRIAL APPLICABILITY

The present disclosure finds applications in driving, for example, vehicle-mounted LEDs.

REFERENCE SIGNS LIST

1 DC-DC controller
1A minimum voltage selector
2 UVLO/TSD circuit
3 band gap reference
4,5 internal voltage generator
6 fault notifier
7 NMOS transistor
8 I/O port
9 ring oscillator
10 control logic circuit
10A register
11 current driver
11A NMOS transistor
11B resistor
11C error amplifier
11D switch
12 short-circuit detector
13 open detector
14 LED current setter
14A external current setter
14B internal current setter
14C DC dimming circuit
14D switch
14E adder
15 dimming controller
20 LED driving device
25 output stage
30 CAN transceiver
35 MCU
40 wire harness 101 selector
A1 to A24 LED array
B battery power supply
CB CAN bus
Cb boot capacitor
Co output capacitor
D1 diode
L1 inductor
N1 switching element
P1 to P4 printed circuit board
R1 resistor
Rextiset1, Rextiset2 setting resistor

The invention claimed is:

1. A light emitting element driving device comprising:
a current driver configured to generate a current to be passed in light emitting elements for a plurality of channels;
a dimming controller configured to control the current driver;
a control logic circuit including a register; and
an external terminal to which a setting resistor is configured to be externally connected,
wherein
in a normal mode in which light emission control for the light emitting elements is performed by the dimming controller, if no communication signal from an external microprocessor is recognized beyond a first predetermined period, the control logic circuit shifts from the normal mode to a first limp home mode, and
in the first limp home mode, the dimming controller
sets a light emitting element current set value based on a terminal current set value commensurate with a resistance value of the setting resistor as well as a DC dimming set value for each of the channels set in the register,
controls the current driver so as to generate a current with the set light emitting element current set value, and
turns on and off the current driver based on a PWM on-duty set value for each of the channels set in the register.

2. The light emitting element driving device according to claim 1, further comprising a first external terminal to which a first setting resistor is configured to be externally connected,
wherein
in the normal mode, the dimming controller
sets the light emitting element current set value based on the terminal current set value commensurate with a resistance value of the first setting resistor and the DC dimming set value, and
controls the current driver so as to generate a current with the set light emitting element current set value,
the external terminal is same as the first external terminal, and
the setting resistor is same as the first setting resistor.

3. The light emitting element driving device according to claim 2,
wherein in the normal mode and in the first limp home mode, a predetermined internal value is configured to be selected as the terminal current set value.

4. The light emitting element driving device according to claim 2,
wherein
in the normal mode and in the first limp home mode, the DC dimming set value for each of the channels is same.

5. The light emitting element driving device according to claim 1, further comprising a second external terminal to which a second setting resistor is configured to be externally connected,
wherein
if no communication signal from the external microprocessor is recognized beyond a second predetermined period after a shift to an idle mode following cancellation of a reset state, the control logic circuit shifts from the idle mode to a second limp home mode,
in the second limp home mode, the dimming controller
sets the light emitting element current set value based on the terminal current set value commensurate with the resistance value of the second setting resistor as well as the DC dimming set value that is common to all the channels,
controls the current driver so as to generate a current with the set light emitting element current set value, and
turns on and off the current driver based on the PWM dimming on-duty set value that is common to all the channels,
the external terminal is different from the second external terminal, and
the setting resistor is different from the second setting resistor.

6. The light emitting element driving device according to claim 5,
wherein
when the second external terminal is left open, the dimming controller sets the terminal current set value at 0.

7. The light emitting element driving device according to claim 5,
wherein
in the first limp home mode, a value commensurate with the resistance value of the second setting resistor is configured to be selected as the terminal current set value.

8. The light emitting element driving device according to claim 1,
wherein
in a stand-by mode reached through a shift from the normal mode on receipt of a dimming stop request in the normal mode, if no communication signal is recognized from the external microprocessor beyond a third predetermined period, the control logic circuit shifts from the stand-by mode to the first limp home mode.

9. The light emitting element driving device according to claim 8, further comprising a DC-DC controller for generating an output voltage to be fed to the light emitting elements,
wherein
on a shift to the first limp home mode, the DC-DC controller performs soft starting.

10. The light emitting element driving device according to claim 1,
wherein
the dimming controller has an external terminal short-circuit protection function in which, on sensing that the external terminal is short-circuited to the ground potential, the dimming controller uses a predetermined set value as the terminal current set value.

11. The light emitting element driving device according to claim 10,
wherein in the first limp home mode, only specific protection functions including the external terminal short-circuit protection function are valid.

12. The light emitting element driving device according to claim 11, wherein
a light emitting element short-circuit protection function that senses a short-circuit in the light emitting elements to perform protection is not included in the specific protection functions.

13. A light emitting element driving device comprising:
a current driver configured to generate a current to be passed in light emitting elements for a plurality of channels;
a dimming controller configured to control the current driver;
a control logic circuit including a register; and
an external terminal,
wherein
in a normal mode in which light emission control for the light emitting elements is performed by the dimming controller, if no communication signal from an external microprocessor is recognized beyond a first predetermined period, the control logic circuit shifts from the normal mode to a first limp home mode, and
in the first limp home mode, the dimming controller
sets a light emitting element current set value based on a terminal current set value commensurate with a value of a current passing at the external terminal as well as a DC dimming set value for each of the channels set in the register,
controls the current driver so as to generate a current with the set light emitting element current set value, and turns on and off the current driver based on a PWM on-duty set value for each of the channels set in the register.

* * * * *